(12) United States Patent
Prasad et al.

(10) Patent No.: US 11,890,958 B2
(45) Date of Patent: Feb. 6, 2024

(54) MULTIFUNCTIONAL CHARGING TOPOLOGY FOR ELECTRIC VEHICLE

(71) Applicant: GM Global Technology Operations LLC, Detroit, MI (US)

(72) Inventors: Rashmi Prasad, Troy, MI (US); Chandra S. Namuduri, Troy, MI (US); Lei Hao, Troy, MI (US); Suresh Gopalakrishnan, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 1 day.

(21) Appl. No.: 17/740,551

(22) Filed: May 10, 2022

(65) Prior Publication Data

US 2023/0365016 A1 Nov. 16, 2023

(51) Int. Cl.
| | |
|---|---|
| *B60L 53/53* | (2019.01) |
| *H02J 7/02* | (2016.01) |
| *H02J 7/00* | (2006.01) |
| *H02M 7/797* | (2006.01) |
| *H02J 3/32* | (2006.01) |

(52) U.S. Cl.
CPC .............. *B60L 53/53* (2019.02); *H02J 3/322* (2020.01); *H02J 7/0068* (2013.01); *H02J 7/02* (2013.01); *H02M 7/797* (2013.01); *B60L 2210/30* (2013.01); *H02J 2207/20* (2020.01); *H02J 2310/48* (2020.01)

(58) Field of Classification Search
CPC ...... B60L 53/53; B60L 2210/30; H02J 3/322; H02J 7/0068; H02J 7/02; H02J 2207/20; H02J 2310/48; H02M 7/797
See application file for complete search history.

(56) References Cited

U.S. PATENT DOCUMENTS

| | | | |
|---|---|---|---|
| 9,621,099 B1 * | 4/2017 | Namuduri | H02K 21/14 |
| 2010/0090626 A1 * | 4/2010 | King | B60L 50/15 |
| | | | 307/77 |

* cited by examiner

*Primary Examiner* — Elim Ortiz
(74) *Attorney, Agent, or Firm* — CANTOR COLBURN LLP (57) ABSTRACT

A system in a vehicle includes a first winding section including first two or more windings and a second winding section including second two or more windings. Each of the second two or more windings corresponds to one of the first two or more windings of the first winding section. The system also includes an inverter including a high side switch and a low side switch corresponding to each of the first two or more windings. The inverter is coupled to a battery of the vehicle and boosts a voltage of a direct current (DC) charger during charging of the battery with the DC charger, converts alternating current (AC) from an AC grid to DC during charging of the battery with the AC grid, and converts DC to AC during supply of the AC grid by the battery.

20 Claims, 6 Drawing Sheets

MULTIFUNCTIONAL CHARGING TOPOLOGY FOR ELECTRIC VEHICLE

INTRODUCTION

The subject disclosure relates to a multifunctional charging topology for an electric vehicle (EV).

EVs may be charged using the power grid (i.e., alternating current (AC)) or a charging station (i.e., direct current (DC) to DC charging). The AC charging may involve a level 1 or level 2 outlet. The DC charging may involve a DC fast charging (DCFC) charger at a lower voltage than the vehicle battery, thereby requiring a voltage boost. Further, reversing the flow allows the EV to power the grid, for example, during a power outage. Accordingly, it is desirable to provide a multifunctional charging topology for an EV.

SUMMARY

In one exemplary embodiment, system in a vehicle includes a first winding section including first two or more windings and a second winding section including second two or more windings. Each of the second two or more windings corresponds to one of the first two or more windings of the first winding section. The system also includes an inverter including a high side switch and a low side switch corresponding to each of the first two or more windings. The inverter is coupled to a battery of the vehicle and boosts a voltage of a direct current (DC) charger during charging of the battery with the DC charger, converts alternating current (AC) from an AC grid to DC during charging of the battery with the AC grid, and converts DC to AC during supply of the AC grid by the battery.

In addition to one or more of the features described herein, the system also includes two or more switches. Each of the two or more switches is controlled to close to connect the first two or more windings of the first winding section to a corresponding one of the second two or more windings of the second winding section or controlled to open to galvanically isolate the first two or more windings from the second two or more windings during the charging of the battery with the AC grid.

In addition to one or more of the features described herein, the second two or more windings of the second winding section are coupled to the AC grid and are magnetically coupled to the first two or more windings of the first winding section based on the two or more switches being controlled to be open.

In addition to one or more of the features described herein, the first two or more windings of the first winding section are coupled to the inverter.

In addition to one or more of the features described herein, the system also includes a boost switch to close and to connect the DC charger to a point between one of the first two or more windings and the high side switch and the low side switch corresponding to the one of the first two or more windings.

In addition to one or more of the features described herein, the high side switch and the low side switch corresponding to the one of the first two or more windings are off and the low side switch and the high side switch corresponding to others of the first two or more windings cycle on and off to boost the voltage of the DC charger.

In addition to one or more of the features described herein, the system also includes a boost switch to close and to connect the DC charger to a common point of the first two or more windings of the first winding section.

In addition to one or more of the features described herein, the high side switch and the low side switch corresponding to each of the first two or more windings cycle on and off and the inverter boosts the voltage of the DC charger according to a duty cycle at which the high side switch and the low side switch corresponding to each of the first two or more windings cycles on and off.

In addition to one or more of the features described herein, the system also includes a boost switch to close and to connect the DC charger to a common point of the second two or more windings of the second winding section based on the two or more switches being controlled to be closed.

In addition to one or more of the features described herein, the high side switch and the low side switch corresponding to each of the first two or more windings cycle on and off and the inverter boosts the voltage of the DC charger according to a duty cycle at which the low side switch and the high side switch corresponding to each of the first two or more windings cycles on and off.

In another exemplary embodiment, a method of assembling a system in a vehicle includes arranging a first winding section including first two or more windings and arranging a second winding section including second two or more windings. Each of the second two or more windings corresponds to one of the first two or more windings of the first winding section. The method also includes arranging an inverter including a high side switch and a low side switch corresponding to each of the first two or more windings, coupling the inverter to a battery of the vehicle, and configuring the inverter to boost a voltage of a direct current (DC) charger during charging of the battery with the DC charger, to convert alternating current (AC) from an AC grid to DC during charging of the battery with the AC grid, and to convert DC to AC during supply of the AC grid by the battery.

In addition to one or more of the features described herein, the method also includes positioning two or more switches such that each of the two or more switches are controlled to close to connect the first two or more windings of the first winding section to a corresponding one of the second two or more windings of the second winding section or controlled to open to galvanically isolate the first two or more windings from the second two or more windings during the charging of the battery with the AC grid.

In addition to one or more of the features described herein, the method also includes coupling the second two or more windings of the second winding section are coupled to the AC grid and magnetically coupling the second two or more windings of the second winding section to the first two or more windings of the first winding section based on controlling the two or more switches to be open.

In addition to one or more of the features described herein, the method also includes coupling the first two or more windings of the first winding section to the inverter.

In addition to one or more of the features described herein, the method also includes configuring a boost switch to be controlled to close and to connect the DC charger to a point between one of the first two or more windings and the high side switch and the low side switch corresponding to the one of the first two or more windings.

In addition to one or more of the features described herein, the method also includes configuring the high side switch and the low side switch to the one of the first two or more windings to be off and configuring the low side switch and the high side switch corresponding to others of the first two or more windings to cycle on and off to boost the voltage of the DC charger.

In addition to one or more of the features described herein, the method also includes configuring a boost switch to be controlled to close and to connect the DC charger to a common point of the first two or more windings of the first winding section.

In addition to one or more of the features described herein, the method also includes configuring the high side switch and the low side switch corresponding to each of the first two or more windings to cycle on and off, wherein the configuring the inverter includes the inverter boosting the voltage of the DC charger according to a duty cycle at which the high side switch and the low side switch corresponding to each of the first two or more windings cycles on and off.

In addition to one or more of the features described herein, the method also includes configuring a boost switch to be controlled to close and to connect the DC charger to a common point of the second two or more windings of the second winding section based on the two or more switches being controlled to be closed.

In addition to one or more of the features described herein, the method also includes configuring the high side switch and the low side switch corresponding to each of the first two or more windings to cycle on and off, wherein the configuring the inverter includes the inverter boosting the voltage of the DC charger according to a duty cycle at which the low side switch and the high side switch corresponding to each of the first two or more windings cycles on and off.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. It should be understood that throughout the drawings, corresponding reference numerals indicate like or corresponding parts and features.

Embodiments of the systems and methods detailed herein relate to a multifunctional charging topology for an EV. As previously noted, a battery of an EV may be charged via an AC or DC source. In addition, the battery of the EV may become the source of power to loads outside the vehicle as well as to those within. For example, the battery of the EV may supply power to the grid during a power outage. A prior approach involved a separate module, referred to as an onboard charging module, for example, for AC charging versus DC charging via an EV charging system. The topology detailed herein facilitates selection of AC or DC charging and also facilitates reversing the direction of flow of current to allow the battery of the EV to become the power source.

Figure 1:
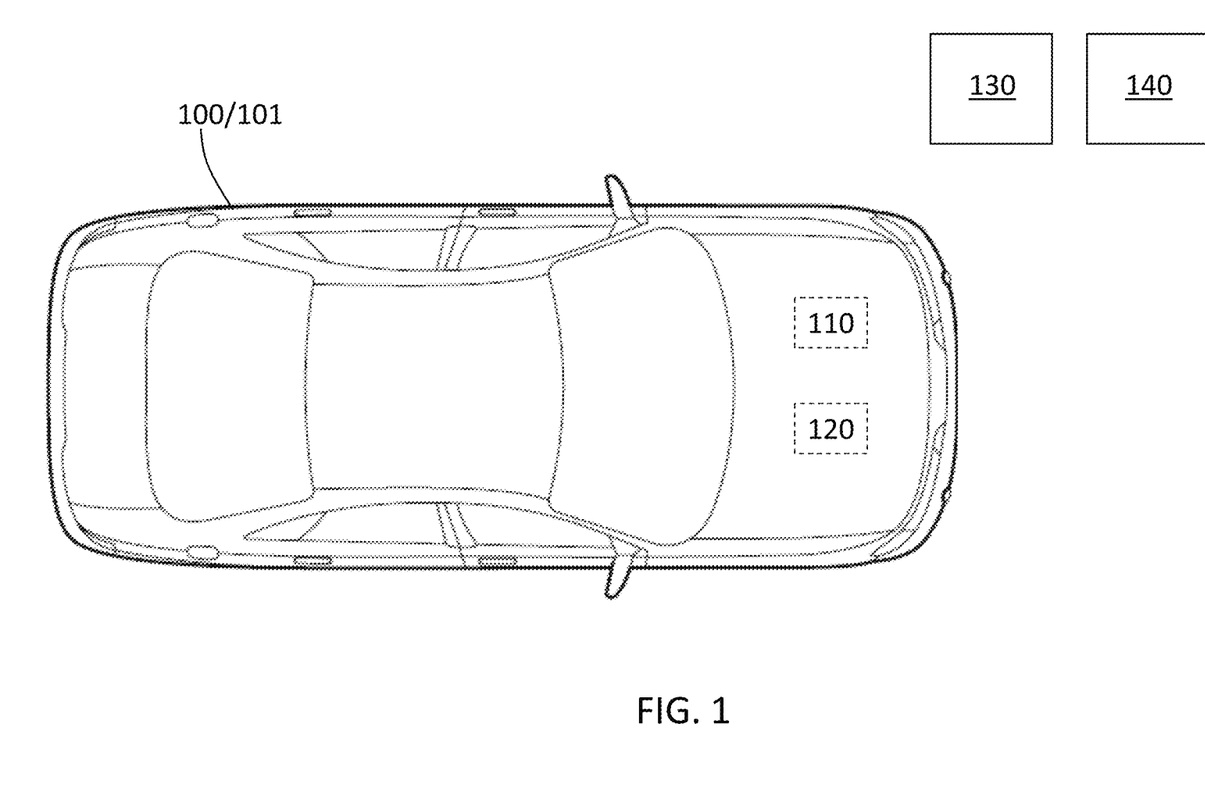
FIG. 1 shows a block diagram of a vehicle 100 with a multifunctional charging topology according to one or more embodiments.

In accordance with an exemplary embodiment, FIG. 1 shows a block diagram of a vehicle 100 with a multifunctional charging topology. The exemplary vehicle 100 shown in FIG. 1 is an automobile 101. The vehicle 100 includes a multifunctional charging system 110, which is detailed with reference to FIG. 2. The vehicle 100 also includes a controller 120. The controller 120 may control aspects of the operation of the vehicle 100 and may also control aspects of the multifunctional charging system 110, as detailed. An AC grid 130 and a DCFC charger 140 are shown outside the vehicle. The controller 120 may include processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

Figure 2:
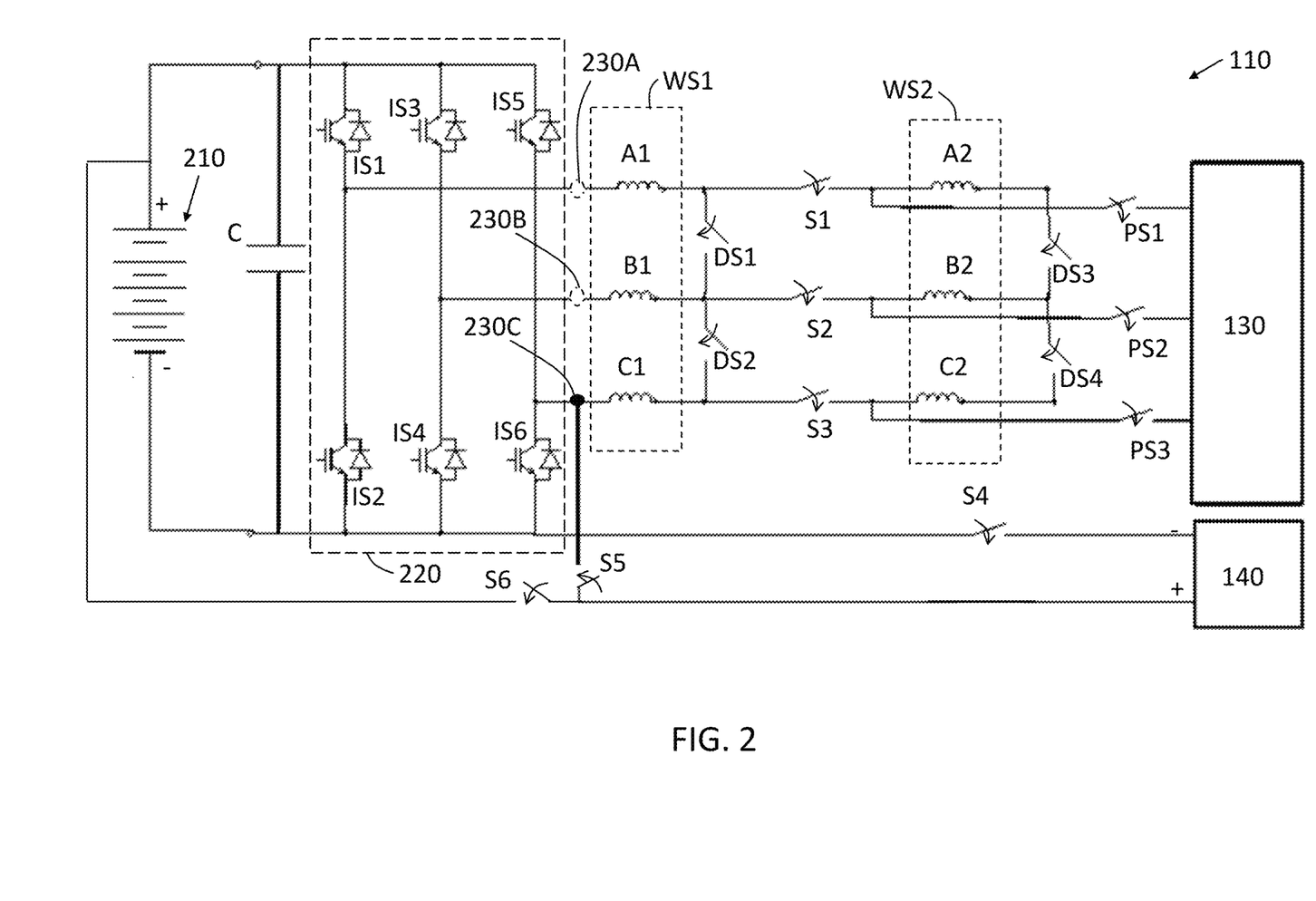
FIG. 2 is a schematic diagram of a multifunctional charging system according to an exemplary embodiment.

FIG. 2 is a schematic diagram of the multifunctional charging system 110 according to one or more embodiments. The multifunctional charging system 110 includes the battery 210 that may be charged with the AC grid 130 or the DCFC charger 140 or may supply the AC grid 130, exchange DC charging power with another vehicle or store energy in place of the DCFC charger 140. An inverter 220 is shown in parallel with a filter capacitor C and the battery 210. The inverter 220 includes switches IS1 through IS6. As discussed with reference to FIGS. 2-4, the inverter 220 acts as a boost converter according to exemplary embodiments. That is, the inverter 220 can boost the voltage Vch of the DCFC charger 140 when it is less than the voltage Vb of the battery 210 and DC charging is being done, and the inverter can convert AC to DC when AC charging is being done via the AC grid 130.

A first winding section WS1 is shown with three sets of windings A1, B1, and C1, and a second winding section WS2 is shown with three sets of windings A2, B2, and C2. The switches S1, S2, and S3 facilitate physical separation of the two winding sections WS1 and WS2 and allow the pairs of windings A1-A2, B1-B2, and C1-C2 to act as transformers. The switches PS1, PS2, and PS3 control the number of phases during AC charging or power transfer. The switches S4 and S5 facilitate charging of the battery 210 via the DCFC charger 140. The switches S1 through S6, DS1 through DS4, and PS1 through PS3 of the multifunctional charging system 110 may be controlled by the controller 120 based on the controller 120 determining a mode of operation (e.g., powering the AC grid 130, charging of the battery 210 via the AC charger 130 or the DCFC charger 140).

All of the switches S1 through S6, DS1 through DS4, and PS1 through PS3 are indicated in open (i.e., disconnected) positions, but, as indicated by the arrows, each of the switches S1 through S6, DS1 through DS4, and PS1 through PS3 may be closed. The switches IS1 through IS6 of the inverter 220 are shown as insulated gate bipolar transistors (IGBTs) and may be on (i.e., connected) or off (i.e., disconnected). According to alternate embodiments, the switches IS1 through IS6 of the inverter 220 may be formed as other suitable power semiconductors such as, for example, a silicon (Si) metal-oxide-semiconductor field-effect transistor (MOSFET), a MOSFET, a silicon carbide (SiC) MOSFET, a SiC junction FET (JFET), a gallium nitride (GaN) high-electron-mobility transistor (HEMT), or a diamond-based MOSFET.

Figure 3:
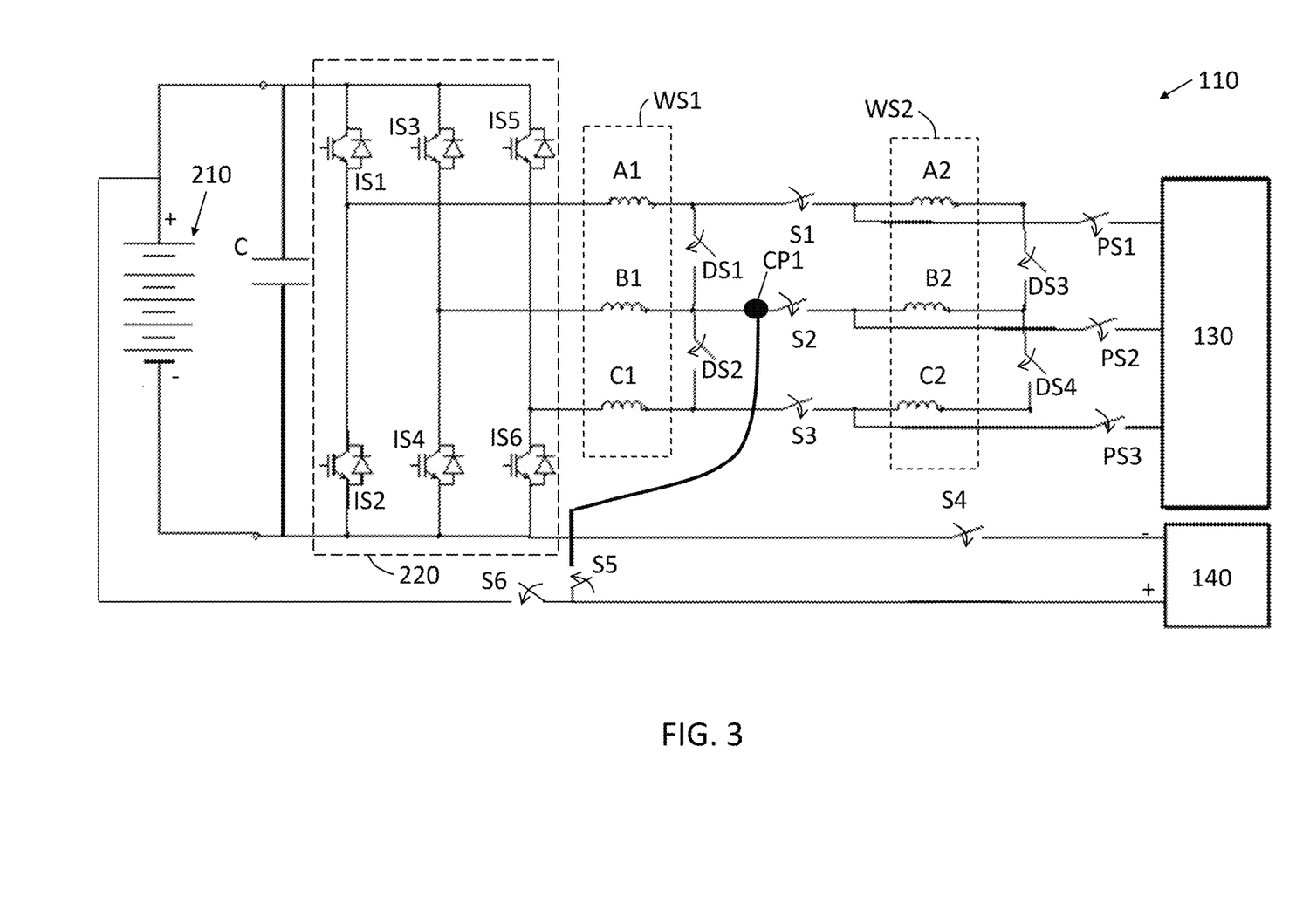
FIG. 3 is a schematic diagram of a multifunctional charging system according to an exemplary embodiment.
Figure 4:
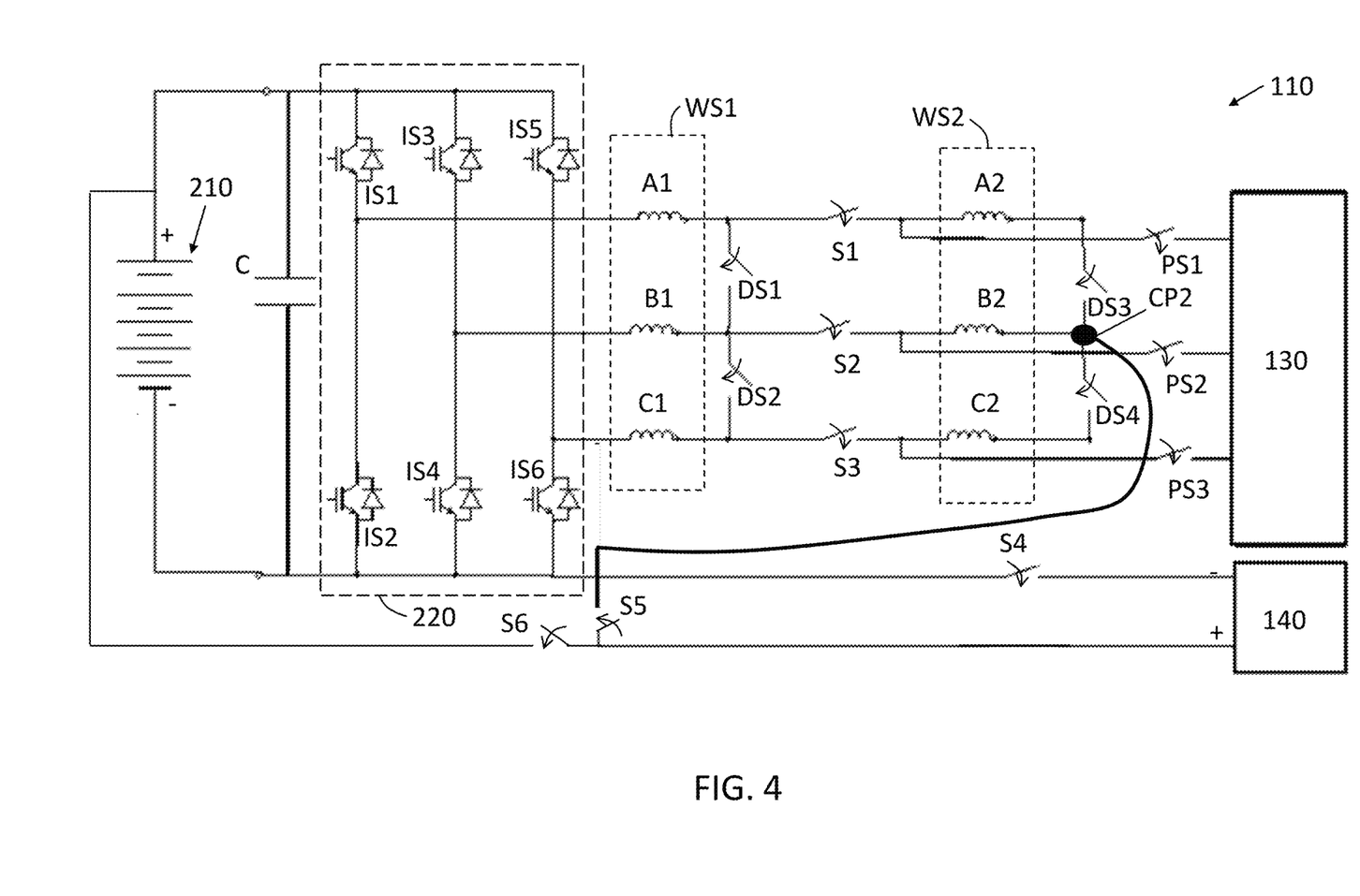
FIG. 4. is a schematic diagram of a multifunctional charging system according to an exemplary embodiment.

Each scenario that is possible with the multifunctional charging system 110 is detailed. Table 1 summarizes the positions of the various switches S1 through S6, DS1 through DS4, and PS1 through PS3, as well as IS1 through IS6, for each scenario. FIGS. 3 and 4 illustrate alternate embodiments that affect one of the scenarios, DC charging with a boost. The default switch positions of the multifunctional charging system 110 may be set for a propulsion mode, in which the battery 210 is used for propulsion of the vehicle 100 and is neither being charged nor charging the AC grid 130. These exemplary default switch positions are indicated in the second column of Table 1.

When the multifunctional charging system 110 is used for AC charging or to facilitate supply of the AC grid 130 from the battery 210, the switch positions are the same, as indicated in the third column of Table 1. Only the direction of flow of current is different. That is, when the multifunctional charging system 110 is used to charge the battery 210, flow is from the AC grid 130 to the battery 210, and when the multifunctional charging system 110 is used to supply the AC grid 130, flow is from the battery 210 to the AC grid 130.

As indicated, the switches S1, S2, and S3 are open. The physical separation of the first winding section WS1 and the second winding section WS2 that results from the switches S1, S2, and S3 being open facilitates galvanic isolation between the first winding section WS1 and the second winding section WS2. The galvanic isolation is necessary for the pairs of windings A1-A2, B1-B2, and C1-C2 to be magnetically coupled and to act as transformers.

For AC charging or to facilitate supply of the AC grid 130 from the battery 210, the switches PS1, PS2, and PS3 being closed allows three phases of the AC grid 130 to be connected to the second winding section WS2. As previously noted, the galvanic isolation between the second winding section WS2 and the first winding section WS1, based on the switches S1, S2, and S3 being open, facilitates magnetic coupling between the pairs of windings A1-A2, B1-B2, and C1-C2. The switches IS1 through IS6 of the inverter 220 are pulse width modulated to act as a boost rectifier to facilitate conversion of AC to DC (in the case of AC charging of the battery 210) or to act as an inverter for conversion of DC to AC (in the case of the battery 210 supplying the AC grid 130.

When the multifunctional charging system 110 is used for DC charging without boost, the switch positions are indicated in the fourth column of Table 1. As previously noted, a boost is needed when the DCFC charger 140 is at a lower voltage than the battery 210. When the DCFC charger 140 is at the same voltage as the battery 210, the DC charging without a boost may be performed. In this case, the positive terminal of the DCFC charger 140 may be connected to the positive terminal of the battery 210 by closing switch S6. The switch S4 is also closed, while the switch S5 is kept open. The switches S1 through S3 and PS1 through PS3 may be kept open, as indicated in Table 1, because the AC grid 130 is not involved.

When the multifunctional charging system 110 is used for DC charging with a boost, a number of possible configurations may be used according to exemplary embodiments discussed with reference to FIGS. 2-4. Specifically, the switch S5 may be used to connect the DCFC charger 140 to different points of the multifunctional charging system 110 according to each of the exemplary embodiments. As shown in FIG. 2, the switch S5 connects the DCFC charger 140 to a connection point 230C corresponding with one of the windings C1 of the first winding section WS1 (i.e., with one of the three phases). This exemplary embodiment is detailed and included in Table 1 for explanatory purposes. However, the switch S5 may connect the DCFC charger 140 to a connection point 230A corresponding with another phase associated with the winding A1 or to a connection point 230B corresponding with yet another phase associated with the winding B1 according to alternate embodiments of this exemplary embodiment.

With the DCFC charger 140 connected to the connection point 230C, as shown in FIG. 2, the associated switches IS5 and IS6 of the inverter 220 are turned off. The other four switches IS1 through IS4, in the exemplary case shown in FIG. 2, are cycled on and off as further discussed. Instead of the illustrated example, if the DCFC charger 140 were connected to the connection point 230A, then only the switches IS1 and IS2 would be turned off, and if the DCFC charger 140 were connected to the connection point 230B, then only the switches IS3 and IS4 would be turned off. As indicated in Table 1, the switches S1 through S3 and PS1 through PS3 are open to disconnect the AC grid 130. As also indicated, the switch S6 is open such that only boosted power from the DCFC charger 140, boosted via the inverter 220, reaches the battery 210.

The duty cycle and interleaving of switch cycling for the switches IS1 through IS4 facilitates obtaining the desired boost while minimizing ripple current into the battery 210. Specifically, the boost ratio is a function of the duty cycle D (i.e., percentage of time that each of the switches IS2 and IS4 is on over a period Ts). That is, the voltage Vb provided to the battery 210 is given by:

$$Vb = \left|\frac{1}{1-D}\right| Vch \qquad [\text{EQ. 1}]$$

The voltage Vch of the DCFC charger 140 is boosted by a value of 1/(1-D). The duty cycle D is the time that a given switch is on (Ton) divided by the period Ts and is a value between 0 and 1. The corresponding inverter switches IS1 and IS3 may be turned on during the time IS2 and IS4 are off to reduce the losses in the diodes of those upper switches using complementary control inputs for the duration of (1−D)*Ts.

Figure 5:
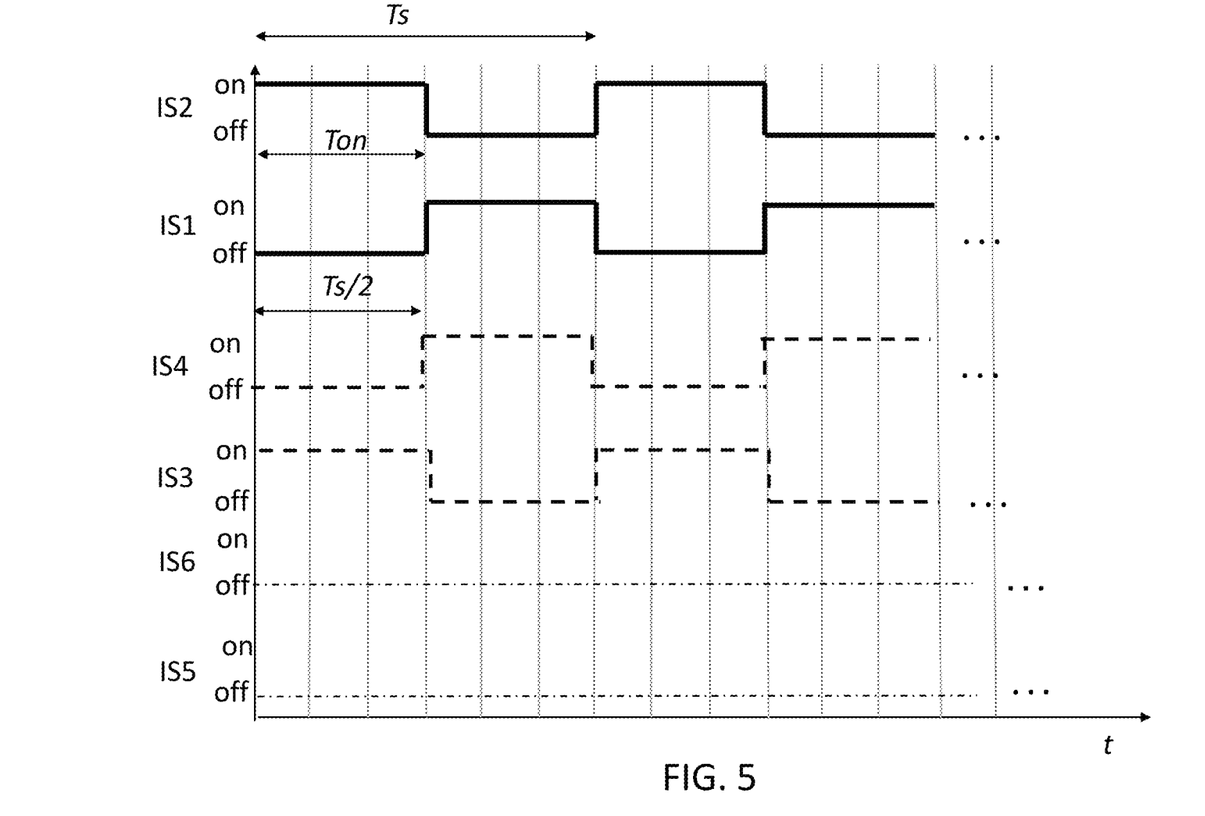
FIG. 5 illustrates an exemplary switching scheme in an inverter of a multifunctional charging system according to one or more embodiments.

Assuming that the voltage Vch of the DCFC charger 140 is half the voltage Vb needed by the battery 210, the duty cycle D must be 50 percent according to EQ. 1. Thus, each of the switches IS2 and IS4 must have a 50 percent duty cycle D (i.e., each must be on for half of a total period Ts and off for half of the period Ts). The total period Ts is the time between a given switch being turned on two consecutive times, as indicated in FIG. 5, for example.

Additionally, if the two low side switches IS2 and IS4 are operated together, the ripple current into the battery 210 is increased. Excess ripple current may cause the capacitor C to overheat or may increase related losses in the battery 210. Thus, according to exemplary embodiments, the low side switches IS2 and IS4 are operated with a phase shift of Ts/2 as shown in FIG. 5, while the corresponding high side switches IS1 and IS3 are operated with complementary signals of the switches IS2 and IS4. That is, the switches IS1 and IS3 are on when the switches IS2 and IS4 are off and are off when the switches IS2 and IS4 are on. In this way, the battery 210 is charged by the DCFC charger 140, via the multifunctional charging system 110, with the sufficient voltage Vb.

TABLE 1

Switch positions for different modes of use of the multifunctional charging system.

| SWITCH | default | AC charging/ supply | DC charging (no boost) | DC charging (boost) |
|---|---|---|---|---|
| IS1 | off | PWM | off | cycle off/on |
| IS2 | off | PWM | off | cycle on/off |
| IS3 | off | PWM | off | cycle off/on |
| IS4 | off | PWM | off | cycle on/off |
| IS5 | off | PWM | off | off |
| IS6 | off | PWM | off | off |
| S1 | closed | open | open | open |
| S2 | closed | open | open | open |
| S3 | closed | open | open | open |
| S4 | open | open | closed | closed |
| S5 | open | open | open | closed |
| S6 | open | open | closed | open |
| DS1 | open | closed | open | closed |
| DS2 | open | closed | open | closed |
| DS3 | closed | closed | open | open |
| DS4 | closed | closed | open | open |
| PS1 | open | closed | open | open |
| PS2 | open | closed | open | open |
| PS3 | open | closed | open | open |

FIG. 3 is a schematic diagram of a multifunctional charging system 110 according to an exemplary embodiment. As previously noted, DC charging of the battery 210 with a boost is affected by the alternate embodiment shown in FIG. 3 when compared with the embodiment shown in FIG. 2. According to the exemplary configuration shown in FIG. 3, when the switch S5 is closed for boosted DC charging of the battery 210, the DCFC charger 140 is connected to a common point CP1 corresponding with all the phases and associated with the first winding section WS1. As indicated in Table 2, the switches S1 through S3 and PS1 through PS3 are open to disconnect the AC grid 130. The switches DS1 and DS2 are closed to connect all three phases while, although indicated as open in Table 2, the switches DS3 and DS4 have no effect in either position.

Assuming again that the voltage Vch of the DCFC charger 140 is half the voltage Vb needed by the battery 210, the duty cycle D must be 50 percent according to EQ. 1. That is, each of the switches IS2, IS4, IS6 must be on for 50 percent of a total period Ts that is defined as a duration between consecutive times that a given one of the switches IS2, IS4, IS6 is turned on. This ensures that the boost is sufficient according to EQ. 1. With regard to the interleaving of low side switches IS2, IS4, IS6 and high side switches IS1, IS3, IS5 to minimize ripple current, all six switches IS1 through IS6 must be considered rather than only four, as in the embodiment discussed with reference to FIG. 2. The interleaving is further discussed with reference to FIG. 6, where the turn-on time of switch IS4 is shifted by Ts/3 with respect to that of switch IS2 and the turn-on time of switch IS6 is shifted by Ts/3 with respect to that of switch IS4 to achieve the desired interleaving to reduce the ripple current into the battery 210. As in the embodiment discussed with reference to FIG. 2, the switch positions shown in Table 2 result in the battery 210 being charged by the DCFC charger 140, via the multifunctional charging system 110, with the sufficient voltage Vb.

TABLE 2

Switch positions for DC charging with a boost using the multifunctional charging system according to an exemplary embodiment.

| SWITCH | DC charging (boost) |
|---|---|
| IS1 | cycle off/on |
| IS2 | cycle on/off |
| IS3 | cycle off/on |
| IS4 | cycle on/off |
| IS5 | cycle off/on |
| IS6 | cycle on/off |
| S1 | open |
| S2 | open |
| S3 | open |
| S4 | closed |
| S5 | closed |
| S6 | open |
| DS1 | closed |
| DS2 | closed |
| DS3 | open |
| DS4 | open |
| PS1 | open |
| PS2 | open |
| PS3 | open |

FIG. 4 is a schematic diagram of a multifunctional charging system 110 according to an exemplary embodiment. As previously noted, DC charging of the battery 210 with a boost is affected by the alternate embodiment shown in FIG. 4 when compared with the embodiments shown in FIGS. 2 and 3. According to the exemplary configuration shown in FIG. 4, when the switch S5 is closed for boosted DC charging of the battery 210, the DCFC charger 140 is connected to a common point CP2 corresponding with all the phases and associated with the second winding section WS2. As indicated in Table 3, the switches 51 through S3 are closed to physically connect the first winding section WS1 and the second winding section WS2, while the switches PS1 through PS3 are open to disconnect the AC grid 130. The switches DS1 and DS2 are open while the switches DS3 and DS4 are closed to connect all three phases.

Assuming again that the voltage Vch of the DCFC charger 140 is half the voltage Vb needed by the battery 210, the duty cycle D must be 50 percent according to EQ. 1. That is, each of the switches IS1 through IS6 must be on for 50 percent of a total period Ts that is defined as a duration between consecutive times that a given one of the switches IS2, IS4, IS6 is turned on. This ensures that the boost is sufficient according to EQ. 1. With regard to the interleaving of low side switches IS2, IS4, IS6 and high side switches IS1, IS3, IS5 to minimize ripple current, all six switches IS1 through IS6 must be considered, as in the embodiment discussed with reference to FIG. 3, rather than only four, as in the embodiment discussed with reference to FIG. 2. The interleaving discussed with reference to FIG. 6, where the turn-on event of IS4 is shifted by Ts/3 with respect to that of IS2 and the turn-on event of IS6 is shifted by Ts/3 with respect to that of IS4 to achieve the desired interleaving to reduce the ripple current into the battery 210. As in the embodiment discussed with reference to FIGS. 2 and 3, the switch positions shown in Table 2 result in the battery 210 being charged by the DCFC charger 140, via the multifunctional charging system 110, with the sufficient voltage Vb.

TABLE 3

Switch positions for DC charging with a boost using the multifunctional charging system according to an exemplary embodiment.

| SWITCH | DC charging (boost) |
|---|---|
| IS1 | cycle off/on |
| IS2 | cycle on/off |
| IS3 | cycle off/on |
| IS4 | cycle on/off |
| IS5 | cycle off/on |
| IS6 | cycle on/off |
| S1 | closed |
| S2 | closed |
| S3 | closed |
| S4 | closed |
| S5 | closed |
| S6 | open |
| DS1 | open |
| DS2 | open |
| DS3 | closed |
| DS4 | closed |
| PS1 | open |
| PS2 | open |
| PS3 | open |

Figure 6:
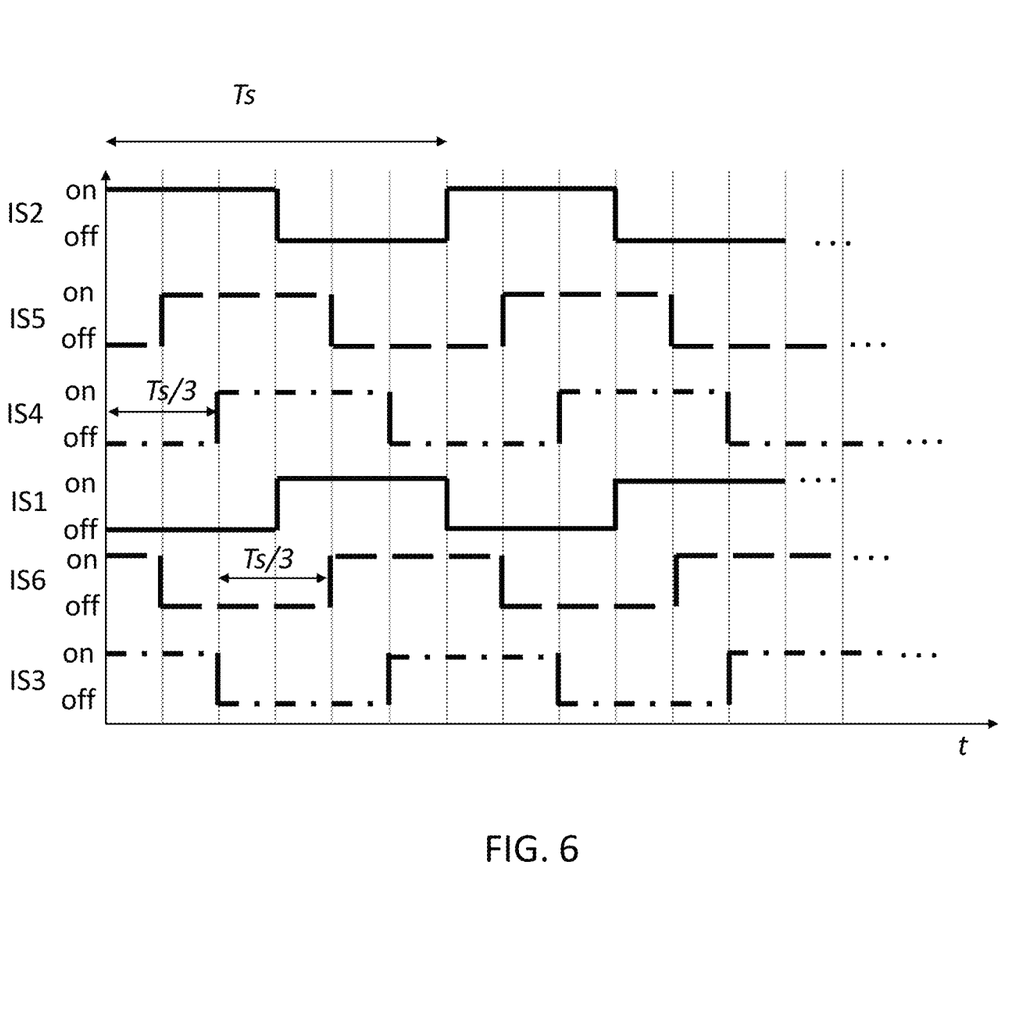
FIG. 6 illustrates another exemplary switching scheme in an inverter of a multifunctional charging system according to one or more embodiments.

FIGS. 5 and 6 illustrate exemplary switching schemes in an inverter 220 of a multifunctional charging system 110 according to one or more embodiments. The three high side switches IS1, IS3, IS5 and the three low side switches IS2, IS4, IS6 of the inverter 220 are indicated with the on and off position of each also indicated. Time t is shown along the perpendicular axis. The total period Ts is shown as the time between two consecutive times that the switch IS2 is turned on. This period Ts is the same for all the switches IS1 through IS6.

FIG. 5 illustrates an exemplary switching scheme in an inverter 220 of the multifunctional charging system 110 according to one or more embodiments. The switching scheme shown in FIG. 5 pertains to DC charging with a boost for the exemplary arrangement shown in FIG. 2 and a 50 percent duty cycle D. As previously noted, when only four switches IS1 through IS4 are cycled (i.e., switches IS5 and IS6 are kept off), as in the exemplary embodiment discussed with reference to FIG. 2, the low side switches IS2 and IS4 associated with different phases are operated with a phase shift of Ts/2 to achieve the 50 percent duty cycle D and requisite interleaving. And, the corresponding high side switches IS1 and IS3 associated with different phases are operated with complementary signals of IS2 and IS4.

FIG. 6 illustrates an exemplary switching scheme in an inverter 220 of the multifunctional charging system 110 according to one or more embodiments. The switching scheme shown in FIG. 6 pertains to DC charging with a boost for the exemplary arrangements of FIGS. 3 and 4 and a 50 percent duty cycle D. When three switches IS1, IS3, IS5 are on the high side and three switches IS2, IS4, IS6 are on the low side, pairing high and low sides to achieve maximum interleaving is less straightforward based on the duty cycle D being 50 percent. As shown in FIG. 6, an offset of Ts/3 is used between the three high side switches IS1, IS3, IS5 and between the three low side switches IS2, IS4, IS6. As FIG. 6 indicates, the switch pairs IS1-IS2, IS3-IS4, IS5-IS6 associated with the same phase have complementary switching cycles (one of the pair is on while the other of the pair is off). In addition, adjacent phase switches (e.g., IS2 and IS4, IS4 and IS6, IS1 and IS3, IS3 and IS5,) have a phase shift of Ts/3 in their switching cycles for optimum interleaving effect.

While the exemplary switching schemes shown in FIGS. 5 and 6 include the phase shifts discussed as minimizing ripple current in the battery 210, different phase shifts or no phase shift may be used in alternate embodiments. For example, if current ripple in the battery 210 is deemed acceptable, a phase shift may not be needed at all to simplify control of the switches IS1 through IS6 of the inverter 220.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A system in a vehicle comprising: a first winding section including first two or more windings; a second winding section including second two or more windings, each of the second two or more windings corresponding to one of the first two or more windings of the first winding section; and an inverter including a high side switch and a low side switch corresponding to each of the first two or more windings, wherein the inverter is coupled to a battery of the vehicle and is configured to boost a voltage of a direct current (DC) charger during charging of the battery with the DC charger, to convert alternating current (AC) from an AC grid to DC during charging of the battery with the AC grid, and to convert DC to AC during supply of the AC grid by the battery; and two or more switches, each of the two or more switches configured to be controlled to close to connect the first two or more windings of the first winding section to a corresponding one of the second two or more windings of the second winding section and to be controlled to open to galvanically isolate the first two or more windings from the second two or more windings during the charging of the battery with the AC grid.

2. The system according to claim 1, wherein the inverter is configured to boost the voltage by controlling a duty cycle by which the high side switch and the low side switch are controlled.

3. The system according to claim 1, wherein the second two or more windings of the second winding section are coupled to the AC grid and are magnetically coupled to the first two or more windings of the first winding section based on the two or more switches being controlled to be open.

4. The system according to claim 3, wherein the first two or more windings of the first winding section are coupled to the inverter.

5. The system according to claim 1, further comprising a boost switch configured to be controlled to close and to connect the DC charger to a point between one of the first two or more windings and the high side switch and the low side switch corresponding to the one of the first two or more windings.

6. The system according to claim 5, wherein the high side switch and the low side switch corresponding to the one of the first two or more windings are configured to be off and the low side switch and the high side switch corresponding to others of the first two or more windings are configured to cycle on and off to boost the voltage of the DC charger.

7. The system according to claim 1, further comprising a boost switch configured to be controlled to close and to connect the DC charger to a common point of the first two or more windings of the first winding section.

8. The system according to claim 7, wherein the high side switch and the low side switch corresponding to each of the first two or more windings is configured to cycle on and off and the inverter is configured to boost the voltage of the DC charger according to a duty cycle at which the high side switch and the low side switch corresponding to each of the first two or more windings cycles on and off.

9. The system according to claim 1, further comprising a boost switch configured to be controlled to close and to connect the DC charger to a common point of the second two or more windings of the second winding section based on the two or more switches being controlled to be closed.

10. The system according to claim 9, wherein the high side switch and the low side switch corresponding to each of the first two or more windings is configured to cycle on and off and the inverter is configured to boost the voltage of the DC charger according to a duty cycle at which the low side switch and the high side switch corresponding to each of the first two or more windings cycles on and off.

11. A method of assembling a system in a vehicle, the method comprising: arranging a first winding section including first two or more windings; arranging a second winding section including second two or more windings, each of the second two or more windings corresponding to one of the first two or more windings of the first winding section; arranging an inverter including a high side switch and a low side switch corresponding to each of the first two or more windings; coupling the inverter to a battery of the vehicle; and configuring the inverter to boost a voltage of a direct current (DC) charger during charging of the battery with the DC charger, to convert alternating current (AC) from an AC grid to DC during charging of the battery with the AC grid, and to convert DC to AC during supply of the AC grid by the battery and positioning two or more switches such that each of the two or more switches are controlled to close to connect the first two or more windings of the first winding section to a corresponding one of the second two or more windings of the second winding section and controlled to open to galvanically isolate the first two or more windings from the second two or more windings during the charging of the battery with the AC grid.

12. The method according to claim 11 wherein the inverter is configured to boost the voltage by controlling a duty cycle by which the high side switch and the low side switch are controlled.

13. The method according to claim 11, further comprising coupling the second two or more windings of the second winding section are coupled to the AC grid and magnetically coupling the second two or more windings of the second winding section to the first two or more windings of the first winding section based on controlling the two or more switches to be open.

14. The method according to claim 13, further comprising coupling the first two or more windings of the first winding section to the inverter.

15. The method according to claim 11, further comprising configuring a boost switch to be controlled to close and to connect the DC charger to a point between one of the first two or more windings and the high side switch and the low side switch corresponding to the one of the first two or more windings.

16. The method according to claim 15, further comprising configuring the high side switch and the low side switch to the one of the first two or more windings to be off and configuring the low side switch and the high side switch corresponding to others of the first two or more windings to cycle on and off to boost the voltage of the DC charger.

17. The method according to claim 11, further comprising configuring a boost switch to be controlled to close and to connect the DC charger to a common point of the first two or more windings of the first winding section.

18. The method according to claim 17, further comprising configuring the high side switch and the low side switch corresponding to each of the first two or more windings to cycle on and off, wherein the configuring the inverter includes the inverter boosting the voltage of the DC charger according to a duty cycle at which the high side switch and the low side switch corresponding to each of the first two or more windings cycles on and off.

19. The method according to claim 11, further comprising configuring a boost switch to be controlled to close and to connect the DC charger to a common point of the second two or more windings of the second winding section based on the two or more switches being controlled to be closed.

20. The method according to claim 19, further comprising configuring the high side switch and the low side switch corresponding to each of the first two or more windings to cycle on and off, wherein the configuring the inverter includes the inverter boosting the voltage of the DC charger according to a duty cycle at which the low side switch and the high side switch corresponding to each of the first two or more windings cycles on and off.

\* \* \* \* \*